(12) United States Patent
Kohler et al.

(10) Patent No.: US 12,708,971 B2
(45) Date of Patent: Aug. 18, 2026

(54) DEVICE FOR CHIP REMOVAL FOR A MACHINE TOOL AND MANUFACTURING SYSTEM

(71) Applicant: CHIRON Group SE, Tuttlingen (DE)

(72) Inventors: Markus Kohler, Immendingen (DE); Dylan Maret, Martigny (CH)

(73) Assignee: CHIRON Group SE, Tuttlingen (DE)

( * ) Notice: Subject to any disclaimer, the term of this patent is extended or adjusted under 35 U.S.C. 154(b) by 412 days.

(21) Appl. No.: 18/367,018

(22) Filed: Sep. 12, 2023

(65) Prior Publication Data

US 2024/0082972 A1 Mar. 14, 2024

(30) Foreign Application Priority Data

Sep. 12, 2022 (DE) ..................... 10 2022 123 232.8

(51) Int. Cl.
*B23Q 11/00* (2006.01)

(52) U.S. Cl.
CPC ................................ *B23Q 11/0067* (2013.01)

(58) Field of Classification Search
CPC .... B23Q 11/0067; B23Q 1/488; B23Q 11/00; B23Q 11/0053; B23Q 11/0046; B23Q 11/0071; B25D 17/20
USPC ........ 173/81, 90, 140–141, 162.1, 197, 198, 173/213, 168–171; 408/1, 8–15, 67, 76, 408/115, 145, 207, 230, 224
See application file for complete search history.

(56) References Cited

U.S. PATENT DOCUMENTS 2,691,312 A * 10/1954 Stewart ..................... B23B 3/32 82/48
3,708,238 A * 1/1973 Kissane ............... B25H 1/0078 408/112
3,958,893 A * 5/1976 Boyajian .............. B25H 1/0078 408/112

(Continued)

FOREIGN PATENT DOCUMENTS

CN 101670575 A * 3/2010 ......... B23Q 11/0046
CN 104477539 A * 4/2015 ............. B65D 90/00

(Continued)

OTHER PUBLICATIONS

Examination Report for corresponding German Patent Application No. 102022123232.8, mailed May 8, 2023.

(Continued)

*Primary Examiner* — Robert F Long
(74) *Attorney, Agent, or Firm* — Jason H. Vick; Amped IP LLC

(57) ABSTRACT

A chip removal device for a machine tool comprises a movable chip cart having a receptacle for a chip basket, a chip cart bay for the chip cart, and a connector piece between an opening of the chip basket and a chip removal opening of a working space of the machine tool for removing chips from the working space. The chip basket is removable from the chip cart. The chip cart bay is arranged in an enclosure of the machine tool. The connector piece is displaceable between a release position in which the chip cart is movable out of the chip cart bay and an operating position in which the connector piece and the chip cart are coupled for chip transfer from the working space into the chip cart. A manufacturing system for machining comprises a machine tool and a device for chip removal.

17 Claims, 7 Drawing Sheets

(56) References Cited

U.S. PATENT DOCUMENTS

| | | | | |
|---|---|---|---|---|
| 4,281,457 | A * | 8/1981 | Walton, II | B23Q 5/06 30/124 |
| 4,310,270 | A * | 1/1982 | Kraus | B23Q 16/001 82/149 |
| 4,648,213 | A * | 3/1987 | Nagata | B23Q 11/0032 451/340 |
| 5,052,411 | A * | 10/1991 | Schoolman | B08B 15/007 408/67 |
| 5,611,137 | A * | 3/1997 | Braun | B23Q 1/626 409/137 |
| 5,702,294 | A * | 12/1997 | Baltazar | B24B 19/02 451/540 |
| 6,120,222 | A * | 9/2000 | Hiramoto | B23Q 11/0042 409/137 |
| 6,138,818 | A * | 10/2000 | Green | B23Q 1/52 29/33 P |
| 6,220,799 | B1 * | 4/2001 | Okutani | B23Q 11/0053 409/164 |
| 6,588,738 | B1 * | 7/2003 | Sukuvaara | B23K 26/0869 269/293 |
| 7,387,478 | B2 * | 6/2008 | Anderson | B23Q 11/0067 409/134 |
| 10,493,581 | B2 * | 12/2019 | Asano | B23Q 11/0825 |
| 11,890,737 | B2 | 2/2024 | Merello | |
| 2001/0041651 | A1 * | 11/2001 | Abe | B23Q 1/0009 409/134 |
| 2005/0031426 | A1 * | 2/2005 | Hiramoto | B23Q 1/01 409/137 |
| 2005/0034715 | A1 * | 2/2005 | Terpstra | B23Q 11/006 83/300 |
| 2006/0045641 | A1 | 3/2006 | Anderson et al. | |
| 2010/0116261 | A1 * | 5/2010 | Fairweather | B23Q 11/0046 83/100 |
| 2012/0020755 | A1 * | 1/2012 | Hiroshima | B23Q 1/015 409/168 |
| 2013/0322979 | A1 * | 12/2013 | Koike | B23Q 1/015 409/206 |
| 2015/0023752 | A1 * | 1/2015 | Matsuyama | B23Q 11/0067 409/137 |
| 2017/0056988 | A1 * | 3/2017 | Guth | B23D 59/00 |
| 2017/0282407 | A1 * | 10/2017 | Fairweather | B24B 55/10 |
| 2018/0085873 | A1 * | 3/2018 | Rompel | B23Q 11/0046 |
| 2019/0076973 | A1 * | 3/2019 | Arthur | B25D 17/20 |
| 2019/0084102 | A1 | 3/2019 | Jeannerat et al. | |
| 2021/0229254 | A1 * | 7/2021 | Merello | B23B 39/14 |
| 2024/0300030 | A1 * | 9/2024 | Merello | B25H 1/0035 |
| 2025/0041981 | A1 * | 2/2025 | Vuadens | B23Q 11/085 |
| 2025/0100111 | A1 * | 3/2025 | Li | B25F 5/02 |
| 2025/0235971 | A1 * | 7/2025 | Vuadens | B23Q 7/046 |

FOREIGN PATENT DOCUMENTS

| | | | | | |
|---|---|---|---|---|---|
| CN | 105880641 | A | | 8/2016 | |
| CN | 106363457 | A | * | 2/2017 | B23Q 11/1069 |
| CN | 106392340 | A | | 2/2017 | |
| CN | 109396944 | A | * | 3/2019 | B23Q 11/1069 |
| CN | 109604666 | A | * | 4/2019 | B23Q 11/0067 |
| CN | 109689287 | A | | 4/2019 | |
| CN | 110039369 | A | | 7/2019 | |
| CN | 110170669 | A | | 8/2019 | |
| CN | 111112752 | A | * | 5/2020 | B23Q 11/1069 |
| CN | 111186163 | A | * | 5/2020 | B23Q 11/0067 |
| CN | 111347283 | A | * | 6/2020 | B23Q 11/0053 |
| CN | 111730404 | A | * | 10/2020 | B01D 46/10 |
| CN | 112171360 | A | * | 1/2021 | B23Q 11/0042 |
| DE | 3139962 | C2 | * | 11/1994 | B23Q 11/0042 |
| DE | 102005030397 | A1 | | 3/2006 | |
| DE | 102009045453 | A1 | * | 4/2010 | B23Q 11/08 |
| DE | 102016205234 | A1 | | 10/2017 | |
| DE | 202022102029 | U1 | | 5/2022 | |
| EP | 2394778 | A1 | | 12/2011 | |
| EP | 3843939 | B1 | * | 3/2023 | B23Q 7/1442 |
| FR | 2816230 | A1 | * | 5/2002 | B23Q 1/5462 |
| JP | S57-17710 | U | | 1/1982 | |
| JP | 4441107 | B2 | * | 3/2010 | |
| KR | 101615863 | B1 | * | 4/2016 | B23Q 11/0042 |
| WO | WO-02100597 | A1 | * | 12/2002 | B23Q 11/006 |
| WO | WO-2006072356 | A1 | * | 7/2006 | B23Q 1/488 |
| WO | WO-2016182379 | A1 | * | 11/2016 | B04B 1/00 |
| WO | WO 2021/033430 | A1 | | 2/2021 | |
| WO | WO-2021022697 | A1 | * | 2/2021 | B23Q 11/1076 |
| WO | WO-2021036003 | A1 | * | 3/2021 | B23G 1/18 |

OTHER PUBLICATIONS

European Search Report for Corresponding European Patent Application No. 23196126.9, mailed Feb. 7, 2024.

First Office Action (Including Machine Translation) for corresponding Chinese Patent Application No. 202311150349.9, mailed Jan. 21, 2026.

* cited by examiner 60
178
178
X
Y
180
180
90
182
178
184
64
178
92
180
180
62

178
178
120
X
Y
90
178
178
180
180
168
168
166
150
186
144
92
76
180
180
142
72
174
64
174

DEVICE FOR CHIP REMOVAL FOR A MACHINE TOOL AND MANUFACTURING SYSTEM

CROSS-REFERENCES TO RELATED APPLICATIONS

This application claims priority to German patent application 10 2022 123 232.8, filed on Sep. 12, 2022. The entire content of this priority application is incorporated herein by reference.

BACKGROUND

The present disclosure relates to a device for chip removal for a machine tool and to a manufacturing system comprising a machine tool and a device for chip removal. According to various aspects, the present disclosure relates to compactly designed machine tools and their integration into manufacturing systems and plants for machining. Compactly designed machine tools are, for example, those having a workspace smaller than 250 mm×250 mm×250 mm.

In exemplary embodiments, the workspace of the machine tool is smaller than 200 mm×200 mm×200 mm. In exemplary embodiments, the workspace of the machine tool is smaller than 150 mm×150 mm×150 mm. In exemplary embodiments, the workspace of the machine tool is smaller than 100 mm×100 mm×100 mm. In exemplary embodiments, the workspace of the machine tool is smaller than 75 mm×75 mm×75 mm. In certain embodiments, these parameters relate to the possible feeds (travels) along the X, Y and Z axes. The workspace can be cube-shaped. However, cuboid-shaped work-spaces are also conceivable, whose traverse paths in X, Y and Z are not uniform. By way of an example, such machine tools designs are suitable for precision machining, for example in the manufacture of watches, jewelry and the like. It goes without saying that other applications are also conceivable, for example in the field of medical technology, precision engineering and the like.

Machine tools and systems for machining production are known. US 2019/0084102 A1 discloses a manufacturing plant, which has a plurality of machine tools of compact design that are arranged one above the other and side by side, which are arranged in a common housing, wherein in addition a robot for the tool change and/or workpiece change is provided. Furthermore, a system for collecting chips is arranged in the enclosure.

EP 2 394 778 A1 discloses a vertical machining center, which has a working area in which a vertically oriented tool spindle is arranged, the working area having a funnel-shaped taper towards the bottom with a bottom-side opening via which chips and the like can fall out of the working area. A (driven) chip conveyor is arranged below the floor-side opening, which conveys chips falling out of the working area horizontally and vertically into an area behind the machining center, where the chips are transferred there from above to a movable chip cart.

By way of example, it has been observed that the desired components can be manufactured with high precision and efficiency using a compact design machine tool, even with relatively small external dimensions of the machine tool.

However, it has also been observed that specific constraints have to be taken into account with regard to automation aspects for compact design machine tools. On the one hand, transfer systems, handling units and the like cannot be designed to be arbitrarily compact. Even if this were possible from a technological point of view, in practice there are often certain minimum dimensions for transfer systems, handling units, robots, grippers and the like. The same applies to the handling of chips, cooling lubricants (cutting fluid) and the like.

This may result in the actual machine tool (and its work space, respectively) being small in relation to the automation technology (handling technology, transfer systems, chip management, cutting fluid management and the like).

Furthermore, it has been observed that even with compact design machine tools, there is often a desire for the possibility of direct visual monitoring by the operator. Similar to machine tools of larger design, access openings (doors) with windows are regularly demanded. In an automated system, this means that this area ("front" of the machine tool) is not available for automation technology and further components.

Furthermore, it has been observed that compact design machine tools are often designed small in relation to commercially available automation technology. This results in specific requirements for the automation of compact design machine tools. Furthermore, new possibilities for automation and interlinking arise that may not have been feasible with conventional machine tools.

In view of this, it is an object of the present disclosure to present a device for chip removal for a machine tool, which is suitable for compact machine tools.

It is a further object of the present disclosure to present a chip removal device that should take into account, as far as possible, specific framework conditions for machine tools of compact design.

It is a further object of the present disclosure to present a chip removal device by means of which it should be possible to implement manufacturing systems that enable partially automated or even highly automated production even with only a small installation space. This relates, for example, to the collection and handling of chips.

It is a further object of the present disclosure to present a chip removal device that should provide sufficient capacity to accommodate chips to enable at least temporary autonomous operation of the machine tool.

It is a further object of the present disclosure to present a chip removal device that shall provide a container for receptacle of chips, with quick changeover being enabled in the event of a full container.

It is a further object of the present disclosure to present a manufacturing system comprising a machine tool and a device for chip removal. The overall design of the manufacturing system shall be small in size and user-friendly.

SUMMARY

According to a first aspect, these and other objects are achieved by a chip removal device for a machine tool, comprising:

- a movable chip cart having a receptacle for a chip basket,
- a chip cart bay for the chip cart, and
- a connector piece between an opening of the chip basket and a chip removal opening of a working space of the machine tool for removing chips from the working space,
- wherein the chip basket is removable from the chip cart,
- wherein the chip cart bay is arranged in an enclosure of the machine tool, and
- wherein the connector piece is displaceable between a release position in which the chip cart is movable out of the chip cart bay and an operating position in which the connector piece and the chip cart are coupled for chip transfer from the working space into the chip cart.

According to another aspect, these and other objects are achieved by a manufacturing system for machining workpieces, comprising:

- at least one machine tool, which is configured for multi-axis machining and which has a tool holder and a workpiece holder which can be moved relative to one another in at least three axes in a working space of the machine tool, and
- a chip removal device, comprising:
  - a movable chip cart having a receptacle for a chip basket,
  - a chip cart bay for the chip cart, and
  - a connector piece between an opening of the chip basket and a chip removal opening of the working space for removing chips from the working space,
  - wherein the chip basket is removable from the chip cart,
  - wherein the chip cart bay is arranged in an enclosure of the machine tool, and
  - wherein the connector piece is displaceable between a release position in which the chip cart is movable out of the chip cart bay and an operating position in which the connector piece and the chip cart are coupled for chip transfer from the working space into the chip cart,
- wherein the chip removal device is arranged at least substantially below the working space of the machine tool.

According to another aspect, the present disclosure relates to a device for chip removal for a machine tool, comprising:

- a movable chip cart with a receptacle for a chip basket that can be removed from the chip cart,
- a chip cart bay for the chip cart, which is integrated in an enclosure of the machine tool, for instance below a working space of the machine tool, and
- a connector piece between an opening of the chip basket and a chip removal opening of the working spaces for removing chips from the working space,
- wherein the connector piece is displaceable between a release position, in which the chip cart is movable out of the chip cart bay, and an operating position, in which the connector piece and the chip cart are coupled for chip transfer from the working space to the chip cart.

In this way, a chip transfer can take place as directly as possible, ideally without an additional (driven) chip conveyor between the working space and the chip cart. Overall, this allows a compact design, also taking into account the automation technology and auxiliary functions of the machine tool.

The connection between the working space of the machine tool and the chip cart is sufficiently tight so that the tendency to contamination is low when the machine tool is operated with the connector piece being in the operating position. In the release position, the chip cart can be easily moved out of its bay. For example, a chip cart with a filled chip basket can be replaced by a new one with an empty chip basket. However, it is also conceivable to empty the chip basket of the chip cart and/or replace it with an empty chip basket.

In an exemplary embodiment, the connector piece remains with the bay when the chip cart has moved out of the bay. According to this embodiment, the connector piece is permanently coupled to the machine tool.

In the operating position, the connector piece is coupled sufficiently tightly with the chip cart. This includes, for example, a chip-tight coupling and, in certain embodiments, a sufficiently cutting fluid-tight coupling of the connector piece with the chip cart. In this way, contamination of the machine tool and its immediate surroundings with chips and/or cutting fluid (cooling lubricants) is effectively reduced or avoided.

The chip cart can be enclosed by the enclosure when the machine tool is operated for machining workpieces. This results in an integral design. Exemplarily, the enclosure has a door through which the chip cart can enter the bay when the connector piece is in the release position. Accordingly, the chip cart has a chassis. The chip cart is rollable/moveable.

In an exemplary embodiment, the chip cart is changed from the front. The chip cart can be moved into or out of the bay at a front side of the machine tool. This constitutes a departure from machine principles with chip conveyors and chip carts, where chip transport takes place to the rear or to the side. This simplifies the operation of the machine tool because essential components can be operated from one and the same side (front, operator side).

The device is used for handling chips (also referred to as: chip management). This includes the collection of chips and, at least in part, also the collection of cutting fluid that adheres to the chips. Both chips and cutting fluid can be at least partially reused or recycled.

The chip transfer from the working space into the chip cart takes place without an additional chip conveyor. By way of example, chips can fall gravity-assisted from the working space into the chip basket of the chip cart.

According to an exemplary embodiment, the chip cart has a columnar body, with the connector piece being disposed above the chip cart and below the working space. This applies at least when there is a chip cart in the bay. In other words, according to this embodiment, the chip cart can be placed below the working space of the machine tool. This facilitates the chip transfer. Chips can be fed by falling out of the working space and reach the chip cart without additional drive. In an exemplary embodiment, the columnar body has a height (in the Z-direction) that is at least twice the width (in the X-direction) and/or twice the depth (in the Y-direction) of the body.

A compact design of the machine tool allows the working space to be arranged at a certain height above the floor, for example from the viewpoint of an operator at table height or standing height. In this way, the space below the working space can be used for other functions, such as chip management.

By way of example, the working space of the machine tool is located in the superstructure of a manufacturing system with a cabinet-like housing. For example, the bay for the chip cart is located in a substructure of a production system with a cabinet-like housing.

In an exemplary embodiment, the bay for the chip cart is located within the cross-section occupied by the working space when viewed from above.

According to another exemplary embodiment, from the point of view of the chip removal opening of the working space, a free, gravity-assisted chip transfer towards the chip basket along a chip removal path is enabled. In exemplary embodiments, this includes a direct, free connection (without deflection) between the working space and the chip basket of the chip cart.

According to another exemplary embodiment, the chip transfer between the chip removal opening and the chip basket takes place without drive, wherein, in certain embodiments, the chip removal path between the working space and the chip basket extends essentially vertically. Chips can fall freely into the chip basket. A driven chip conveyor is not required.

According to another exemplary embodiment, the connector piece can be moved vertically, wherein a latching element is provided that secures the connector piece in the release position, if required. This allows the connector piece to be specifically transferred into the release position when a chip cart or a chip basket is to be changed and/or emptied.

According to another exemplary embodiment, in the operating position, the connector piece rests with a seal, for instance a circumferential seal, on an edge, for instance a circumferential edge, of the chip cart, wherein the connector piece has a mouth towards the chip basket, which in the operating position projects from above into the opening of the chip basket.

This further reduces the tendency to contamination. The connector piece can rest sufficiently tightly on the edge of the chip cart with the seal due to its own weight. At the same time, it is easy to uncouple the connector piece from the chip cart.

According to another exemplary embodiment, the chip cart comprises along its vertical extension a chassis, a cutting fluid handling section and the receptacle for the chip basket, wherein the cutting fluid handling section is arranged between the chassis and the receptacle, wherein the receptacle tightly encloses the chip basket on multiple sides, and wherein the cutting fluid handling section has an operating opening that is accessible for an operator even with the chip cart positioned at the chip cart bay. This may include opening a door of the enclosure, if required.

In this way, the chip cart can be easily decoupled from a cutting fluid container, so that also in this respect emptying or changing can be carried out with little effort. For example, moving the chip cart out of the bay involves opening a door of the enclosure, moving the connector piece to the release position, and disconnecting a cutting fluid drain line in the cutting fluid handling section.

According to another exemplary embodiment, a cutting fluid drain line with a quick coupling is arranged in the cutting fluid handling section, which can be operated through the operating opening. In this way, cutting fluid that was previously mixed with the chips can be collected.

According to another exemplary embodiment, at least the receptacle of the chip cart is arranged above a movable cutting fluid pan, wherein the cutting fluid pan has at least one recess for the chip cart, for instance for a chassis of the chip cart. In other words, in the operational state, the chip basket of the chip cart is arranged between the working space (or the connecting piece) and the cutting fluid pan. The cutting fluid pan is arranged below the chip basket. The chip basket is arranged below the working space. The at least one recess for the chip cart at the cutting fluid pan allows the chip cart to be moved in and moved out. Both the cutting fluid pan and the chip cart can be mounted on the floor, for example via a respective chassis or frame.

According to another exemplary embodiment, the device further comprises an underfloor bay for the movable cutting fluid pan, wherein the cutting fluid pan is movable out of the underfloor bay when the chip cart is moved out of the chip cart bay. In this way, the cutting fluid pan can also be easily changed and/or emptied. The installation space below the working space of the machine tool is well utilized. The compact design of the machine tool is retained.

According to another exemplary embodiment, the cutting fluid pan and the chassis of the chip cart are at least sectionally interlaced with each other. In certain embodiments, this relates to the use of the space below the working space of the machine tool in the area of the floor. The term interlacing relates to geometric interlacing (compare interlaced fingers). The interlacing allows the floor-side guiding and moveability of both the chip cart and the cutting fluid pan.

In an exemplary embodiment, the cutting fluid pan provides at least one guide for the chip cart, into which the chip cart can enter with its chassis when entering the bay.

According to another exemplary embodiment, the chassis of the chip cart comprises at least three rollers, whose connection points with the chassis span a first surface, wherein the cutting fluid pan has a chassis with at least three rollers, whose connection points with the chassis span a second surface, and wherein the first surface and the second surface at least partially overlap in a top view. Typically, the surfaces spanned by each of the at least three rollers are horizontal surfaces. The surfaces at least partially overlap, again illustrating that the installation space under the working space of the machine tool is favorably utilized. The top view comprises a view along the vertical (from above or from below along the Z-axis)

According to another exemplary embodiment, the cutting fluid pan has a cutting fluid container that is at least partially U-shaped in a top view and is interrupted by the recess that is accessible for at least one section of the chassis of the chip cart. The top view is along a vertical axis and accordingly shows horizontal planes of the device.

By way of example, the recess serves for receiving two right or two left rollers of the chassis of the chip cart, with the two rollers forming a track.

According to another exemplary embodiment, the cutting fluid pan in a top view occupies a footprint that is at least 50% larger than the footprint of the chip cart (and/or the chip basket). In another exemplary embodiment, the cutting fluid pan in the top view occupies a footprint that is at least 100% larger than the footprint of the chip cart (and/or the chip basket).

According to another exemplary embodiment, the chip basket occupies a vertical extension that is at least 50% greater than the vertical extension of the cutting fluid pan (or the cutting fluid container). According to another exemplary embodiment, the chip basket occupies a vertical extension that is at least 100% or even 200% greater than the vertical extension of the cutting fluid pan (or the cutting fluid container).

In this way, the cutting fluid pan can be flat and still have a high capacity. The cutting fluid can flow into the cutting fluid pan and be distributed there. The chip cart, on the other hand, has a larger vertical extension for the chip basket, so that it also has a high capacity. Chips can be accumulated and stored on top of each other in the chip basket.

According to another, there is presented a manufacturing system for machining, for instance for manufacturing precision mechanical workpieces, comprising:

- at least one machine tool, for instance a machine tool of compact design, which is designed for multi-axis machining and which has a tool holder and a workpiece holder which can be moved relative to one another in at least three axes in a working space of the machine tool, and
- a device for chip removal according to at least one of the embodiments shown herein, which is disposed at least substantially below the working space.

In this way, for instance, chips produced in the working space can be fed directly into a chip basket of the chip cart without a chip conveyor. Chips produced during operation of the machine tool can be collected in the chip cart. The chip cart itself and/or the chip basket contained in the chip cart can be changed and/or emptied quickly and easily.

The chip cart primarily occupies an installation space below the working space of the machine tool, where a cutting fluid pan can also be arranged. The front of the workspace is therefore free and accessible for an operator, at least in exemplary arrangements. The front side can also be referred to as the operator side. The front side is arranged opposite the rear side. Lateral sides of the work space are available for handling (workpiece change, tool change). In this way, the compact design is taken into account.

By way of example, the manufacturing system includes a plurality of chip carts, one of which is moved into the bay below the machine tool. The chip cart can then be changed quickly by replacing a full cart with an empty cart. It is of course also conceivable to change only the chip basket. In this way, when the chip basket is full, the operating capability of the machine tool can be quickly reestablished.

According to another exemplary embodiment, the chip cart has a cross-section in a top view that lies within a projection of an outline of the working space of the machine tool. In this way, the chip cart does not enlarge the floor plan of the manufacturing system or enlarges it only insignificantly.

According to another exemplary embodiment, the manufacturing system comprises a cabinet-like enclosure surrounding an upper part and a lower part, wherein the machine tool with its working space is arranged in the upper part, and wherein the chip cart is arranged in the lower part below the working space of the machine tool. In an exemplary embodiment, the manufacturing system comprises a common housing (also: enclosure) for the machine tool and the bay of the chip cart.

It is to be understood that the previously mentioned features and those mentioned in the following may not only be used in the respectively indicated combination, but also in other combinations or as isolated features without leaving the spirit and scope of the present disclosure.

BRIEF DESCRIPTION OF THE DRAWINGS

Further features and advantages of the present disclosure will be apparent from the following description and explanation of several exemplary embodiments with reference to the drawings, wherein.

EMBODIMENTS

Figure 1:
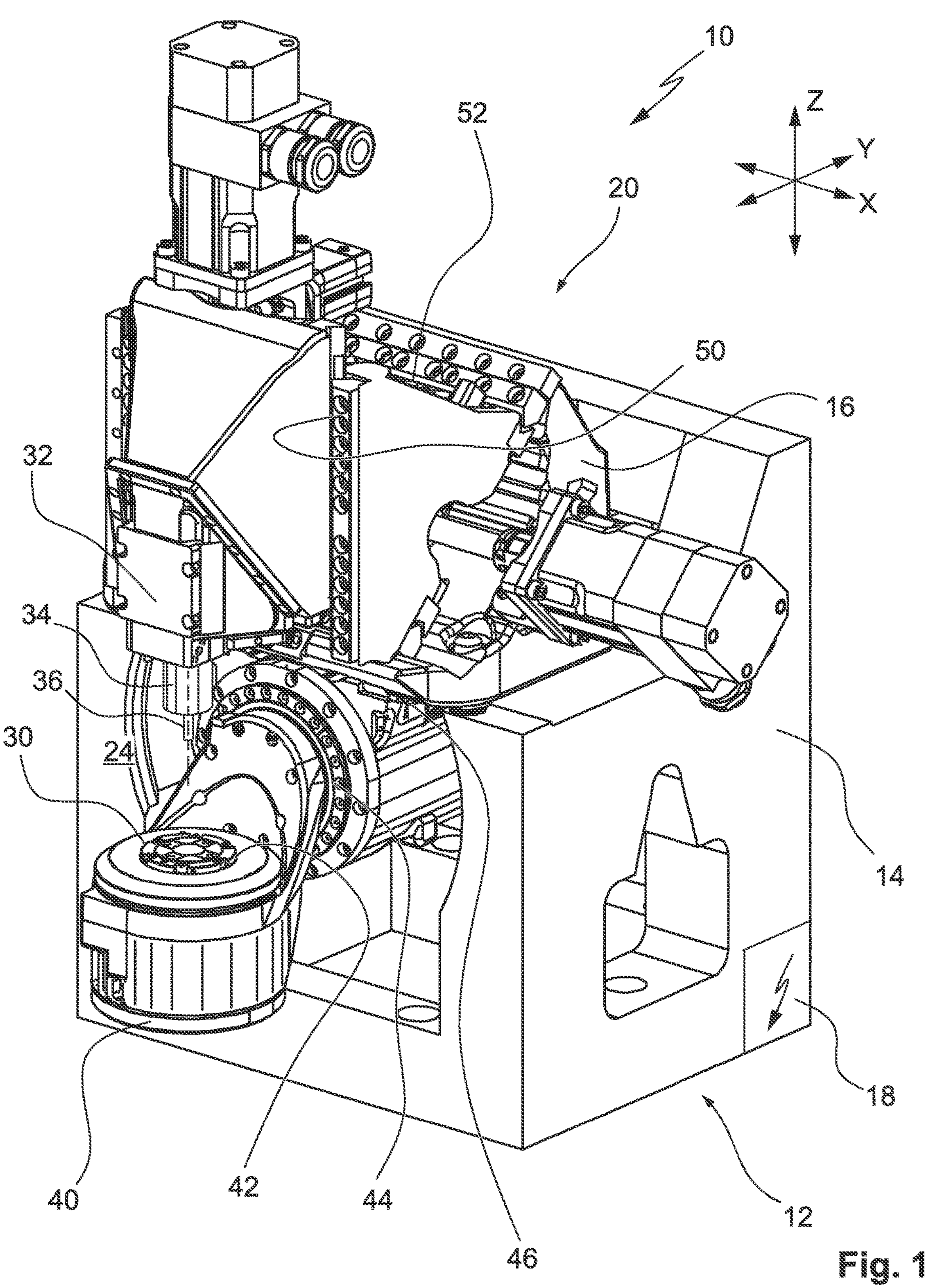
FIG. 1: is a perspective view of a machine tool.

FIG. 1 illustrates by means of a perspective view an exemplary embodiment of a compact design machine tool 10 that is suitable for manufacturing precision mechanical components. The machine tool 10 comprises a frame 12, which in the exemplary embodiment comprises a base frame 14, on which a frame block 16 is mounted. Significant forces generated during machining are absorbed by the frame block 16. The base frame 14 serves as a support for the frame block 16. In FIG. 1, a control device of the machine tool 10 is further indicated by 18. The control device 18 controls components and functions of the machine tool 10 to machine workpieces in the desired manner. Control via external devices is also conceivable.

The machine tool 10 further comprises kinematics 20 configured as a multi-axis kinematics. In at least some of the Figures, a Cartesian coordinate system X-Y-Z is shown for illustrative purposes. The X-Y-Z coordinate system includes an X-axis (lateral direction), a Y-axis (depth direction), and a Z-direction (height direction). The X-axis and the Y-axis are horizontal axes in the exemplary embodiment. The Z-axis is a vertical axis in the exemplary embodiment. The X-Y-Z axes are orthogonal to each other. The X-Y-Z coordinate system is primarily used to illustrate and describe components and functions of the machine tool 10. It is understood that other coordinate systems may also be used for these purposes. The coordinate system X-Y-Z is therefore not to be understood in a limiting sense. The person skilled in the art can carry out the necessary conceptual steps for the conversion into other coordinate systems without further ado.

In the exemplary embodiment, the kinematics 20 comprise various components which are mounted indirectly or directly on the frame block 16. This ensures short force paths and high stiffness. In FIG. 1, further a workspace is indicated by 24, in which machining with the machine tool 10 takes place.

The machine tool 10 further comprises a workpiece holder 30 (also: workpiece receptacle) for holding at least one workpiece to be machined. Furthermore, a tool spindle 32 is provided. The tool spindle 32 includes a tool holder 34 configured to receive a tool 36. The tool 36 is rotationally drivable to machine a workpiece held by the workpiece holder 30.

In the exemplary embodiment, the workpiece holder 30 sits on a cantilever arm 40 that is guided on one side, which accommodates a swivel drive or rotary drive 42 for the workpiece holder 30. The rotational axis provided in this manner may also be referred to as C-axis. The cantilever arm 40 is coupled to a linear drive 46 via another rotary drive 44, which in turn is mounted to the frame block 16. The rotary drive 44 provides a rotational axis, which may be referred to as B-axis. The linear drive 46 provides a translational axis, which may be referred to as Y-axis.

The tool spindle 32 is coupled to the frame block 16 via a linear drive 50 and a linear drive 52. The linear drive 50 provides a translational axis, which can also be referred to as Z-axis. The linear drive 52 provides a translational axis, which may also be referred to as X-axis. The two linear drives 50, 52 form a cross-slide drive. In the exemplary embodiment, two translational axes (X, Z) are associated with the tool spindle 32 and the tool, respectively. A translational axis (Y) is associated with the workpiece holder 30 and the workpiece, respectively. Furthermore, in the exemplary embodiment, two rotatory axes/swivel axes (B, C) are associated with the workpiece holder 30 and the workpiece, respectively. Other types of assignment are conceivable and depend on the machine kinematics concept.

Overall, the machine tool 10 provides a compact workspace 24. This in turn leads to a small size of the machine tool 10, combined with low weight and low energy requirements. At the same time, high precision and a high material removal rate can be ensured due to the design-specific rigidity. The workspace 24 is easily accessible, since the workpiece holder 30 and the tool holder 34 are each arranged and mounted on a rear side of the workspace 24 indirectly or directly on the frame block 16 and on the base frame 14 of the frame 12. Thus, basically three sides (front side as well as two lateral sides) are available for horizontal access to the workspace 24. Furthermore, an upper side and a lower side of the working space 24 can also be used at least to a limited extent, for example for handling coolant, for chip management and for other purposes.

Figure 2:
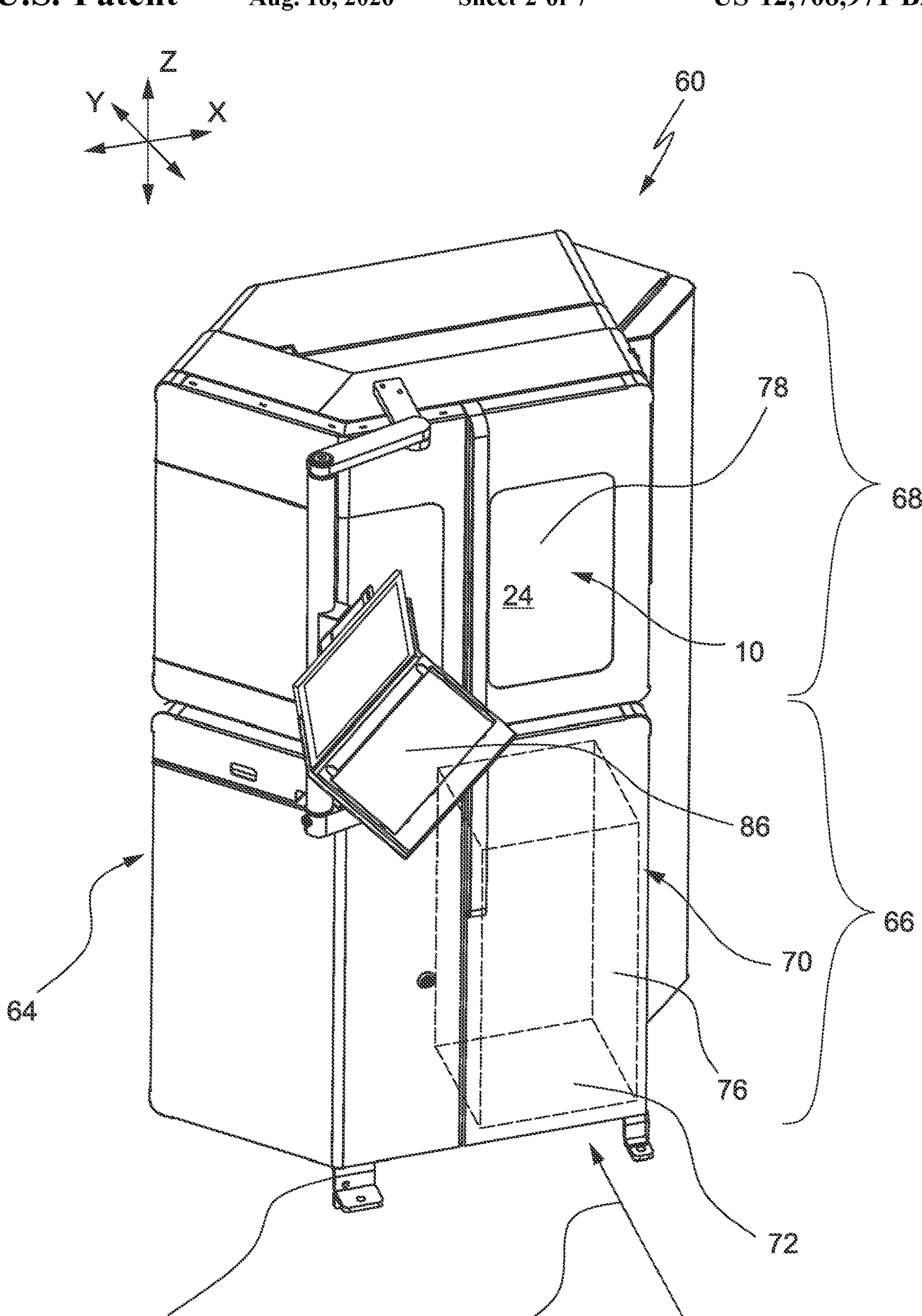
FIG. 2: is a perspective view of a manufacturing system with a machine tool and a device for chip removal, which are arranged in a common enclosure.

FIG. 2 illustrates, by means of a perspective view, a manufacturing system generally indicated by 60 that houses a machine tool 10 that is for instance configured as shown in FIG. 1. The manufacturing system 60 includes a frame 62 and an enclosure 64 that is cabinet-like in the embodiment. The enclosure 64 may also be referred to as a housing. In an exemplary embodiment, the enclosure 64 is configured to be approximately man-high. In the exemplary embodiment, the manufacturing system 60 has a compact design, with the manufacturing system 60 having a layout similar to a high cabinet. This is not to be understood in a limiting manner. The frame 62 may also be referred to as the base frame of the manufacturing system 60. In turn, the frame 12 (also: machine tool rack) of the machine tool 10 illustrated in FIG. 1 is arranged at or on the frame 62.

The manufacturing system 60 design shown in FIG. 2 includes a lower part 66 and an upper part 68 disposed thereon, which exemplarily house and spatially separate various assemblies of the manufacturing system 60. In addition to the machine tool 10, the manufacturing system 60 includes a device 70 for chip removal. The device 70 may also be referred to as a chip removal device. In the embodiment, the lower part 66 houses the device 70. The device 70 provides a chip cart bay 72 (indicated by dashed lines in FIG. 2) for a chip cart. The device 70 is closable by a door 76 of the enclosure 64. Similarly, the machine tool 10 (and/or its working space 24) is closable by a door 78 of the enclosure 64.

The machine tool 10 is assigned with its working space 24 to the upper part 68 of the manufacturing system 60. This places the machine tool 10 at a convenient height for a standing or seated operator. The device 70 for chip removal is assigned to the lower part 66 of the manufacturing system 60. The device 70 is arranged below the working space 24 of the machine tool 10.

In FIG. 2, an arrow designated by 84 indicates a front side of the manufacturing system 60 and the machine tool 10, respectively. For example, an operator operating the manufacturing system 60 at the front 84 can observe and operate the machine tool 10 and the device 70 for chip removal via the doors 76, 78. FIG. 2 further shows a control console, indicated by 86, for controlling the manufacturing system 60, which also faces the front 84. The operator console 86 is associated with and/or coupled to the control device 18. The compactness of the machine tool 10 and the manufacturing system 60 provided therewith simplifies operation. Relevant components of the manufacturing system 60 can be viewed and accessed by the operator at the front 84.

Furthermore, the cabinet-like design with the lower part 66 and the upper part 68 allows the chip cart bay 72 to be arranged below the working space 24, this also applies when viewed along the vertical (compare the arrow Z in the coordinate system X-Y-Z). Viewed from above, the working space 24 partially or completely covers the chip cart bay 72, at least in exemplary embodiments.

Figure 3:
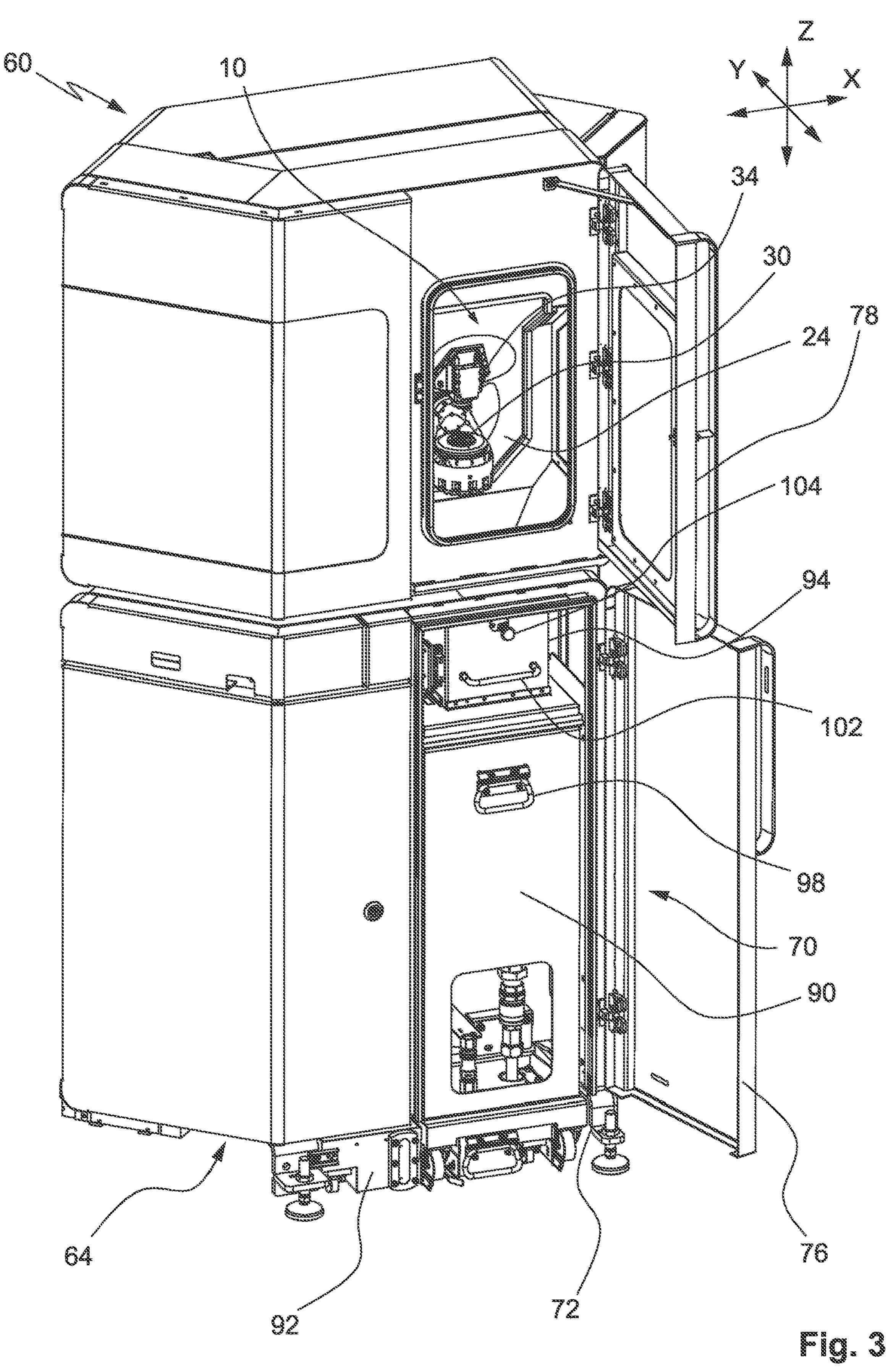
FIG. 3: is a perspective partial view of the manufacturing system based on FIG. 2 with doors of a working space of the machine tool and a chip cart bay of the chip removal device that are opened from an operator's perspective.
Figure 4:
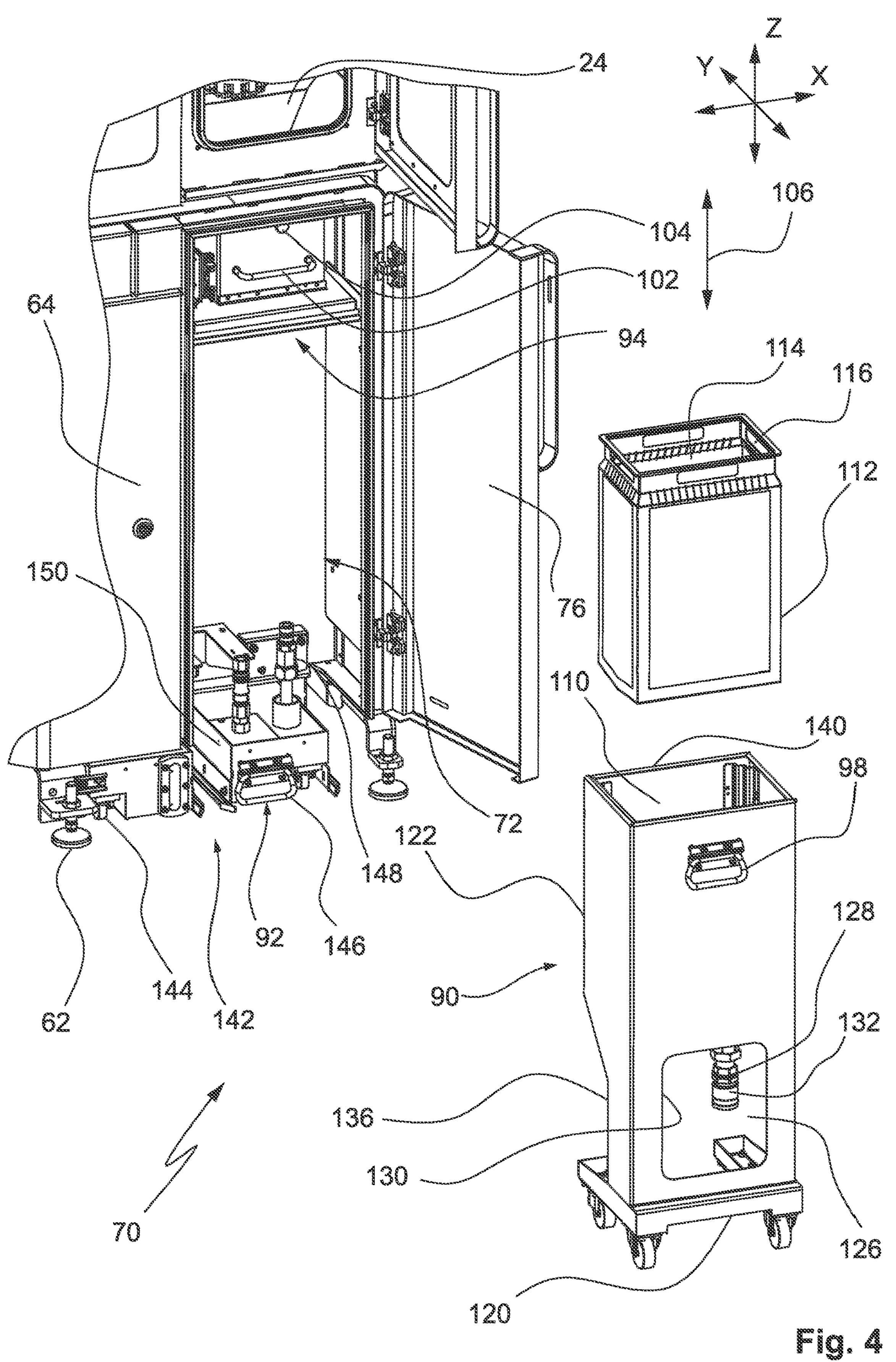
FIG. 4: is a partial view based on FIG. 3, wherein a chip cart is moved out of the chip cart bay, and wherein a chip basket is removed from the chip cart.
Figure 5:
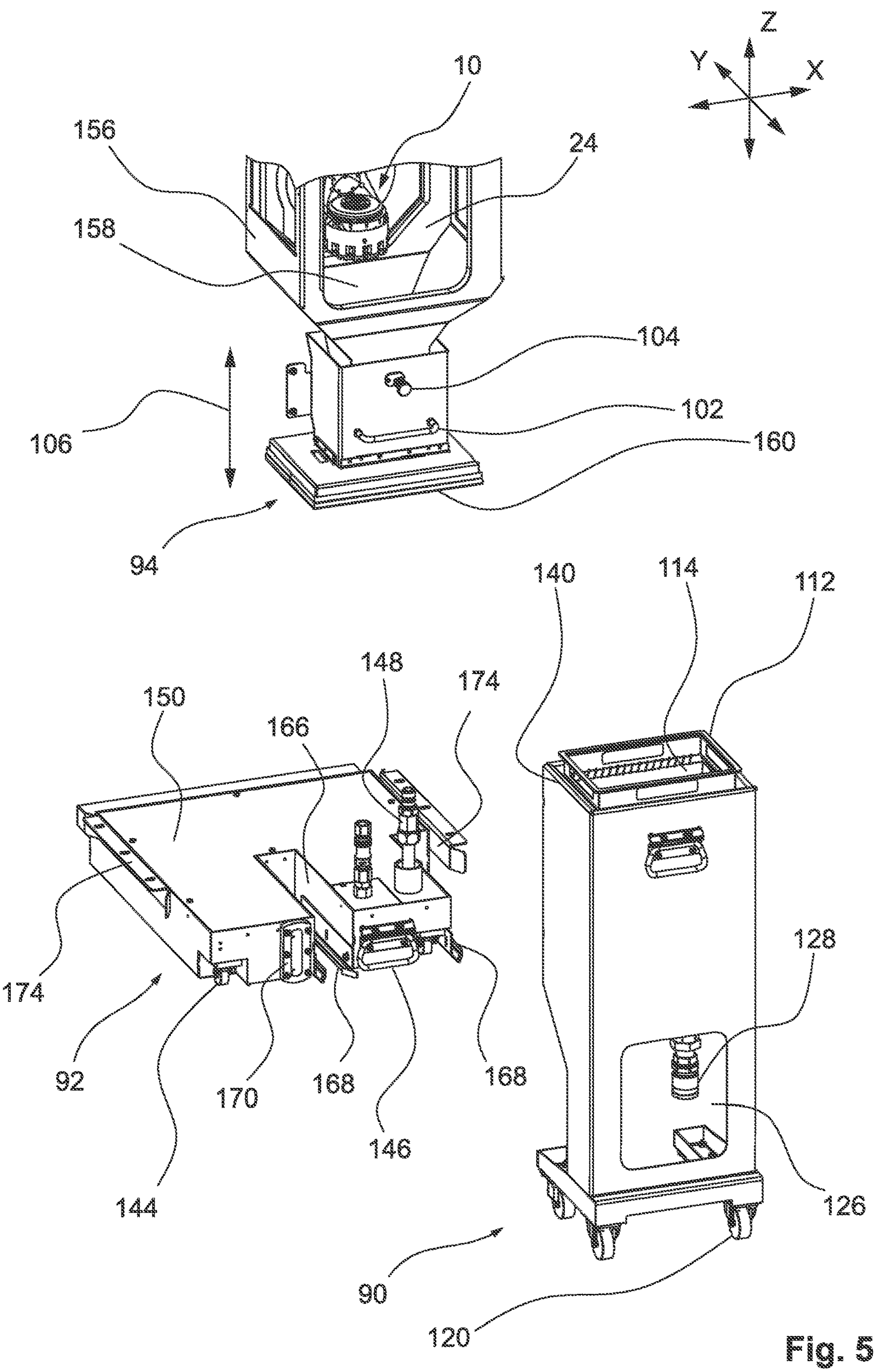
FIG. 5: is a view based on FIG. 3 and FIG. 4 with the enclosure omitted.

FIGS. 3-5 illustrate further components of the device 70 and their interaction with the machine tool 10. FIGS. 2-5 respectively show the manufacturing system 60 and/or components thereof from the same perspective (at the front 84 from diagonally above). In FIG. 2, the enclosure 64 is closed. In FIG. 3, at least the doors 76 and 78 of the enclosure 64 are open. With the door 78 open, the working space 24 of the machine tool 10 is accessible for an operator located at the front 84. In the working space 24, the workpiece holder 30 and the tool holder 34 are arranged and movable relative to each other.

When the door 76 is open, the device 70 is accessible. A chip cart 90 is located at the chip cart bay 72 and can be moved out of the chip cart bay 72, if necessary. This is the case, for example, when the chip cart 90 is completely filled with chips and other debris. In the exemplary embodiment, the chip cart 90 is arranged at least partially above a cutting fluid pan 92 for receptacle of cooling lubricants and the like. This can also refer to cooling lubricants or cutting fluid mixed with chips in the chip cart 90 and flowing towards the cutting fluid pan 92.

The working space 24 of the machine tool 10 is connected to the chip cart 90 via a connector piece 94. In this way, chips can fall as directly as possible from the working space 24 into the chip cart 90. This is for instance done by gravity and without an additional (driven) chip conveyor.

A handle 98 is formed on the chip cart 90. The connector piece 94 includes a handle 102 and a latching element 104 for handling purposes. The chip cart 90 can be pulled out of the chip cart bay 72 in the enclosure 64 by the handle 98. The handling elements allow for quick and easy changing or emptying of the chip cart 90. The chip cart 90 is located entirely below the working space 24. This is made possible by the raised arrangement of the machine tool 10 at the upper part 68 of the enclosure 64. This is in turn facilitated by the compact design of the machine tool 10.

FIG. 4 shows a partial view of the enclosure 64 with the door 76 open to further illustrate components of the device 70. In FIG. 4, the chip cart 90 is moved out of the chip cart bay 72 in the enclosure 64. This is enabled when the connector piece 94 is in a release position. The connector piece 94 is vertically movable between the release position and an operating position, compare a double arrow indicated by 106 in FIG. 4. The handle 102 is used for handling. The latching element 104 can be used to latch or lock the connector piece 94 in the release position.

The chip cart 90 provides a receptacle 110 for a chip basket 112. In exemplary embodiments, the chip basket 112 is removable from the receptacle 110. Accordingly, the chip cart 90 can be changed in its entirety as needed, so that a full chip cart 90 can be replaced with an empty chip cart 90. However, it is also possible to change or empty only the chip basket 112 when the chip cart 90 has moved out of the chip cart bay 72. The chip basket 112 has an opening 114 through which chips can fall from the working space 24 into the chip basket 112. For this purpose, the chips pass through the connector piece 94. Furthermore, at least one handle 116 is provided for the chip basket 112 in the exemplary embodiment, so that the chip basket 112 can also be handled separately.

The chip cart 90 has a chassis 120 at its lower end, which supports a body 122. The body 122 surrounds the receptacle 110. In the area of the receptacle 110 for the chip basket 112, the body 122 is approximately box-shaped and open at the top. The handle 98 is attached to the body 122. The receptacle 110 is located above a cutting fluid handling section 126. The cutting fluid handling section 126 is disposed between the chassis 120 and the receptacle 110. In the cutting fluid handling section 126 there is arranged a cutting fluid drain line 128 that allows excess coolant to drip or drain from the chip basket 112 toward the cutting fluid pan 92. The cutting fluid handling section 126 comprises an operating opening 130, via which at least the cutting fluid drain line 128 is accessible, which in the embodiment comprises a quick coupling 132.

In the region of the cutting fluid handling section 126, the body 122 of the chip cart 90 has a rear frame recess 136. This allows a favorable arrangement of the chip cart 90 with respect to the cutting fluid pan 92 in the enclosure 64 of the manufacturing system 60. In the direction towards the connector piece 94, the chip cart 90 has a circumferential edge 140, which is contacted by the connector piece 94 in the operating position (compare FIG. 9), in order to couple the chip cart 90 sufficiently tightly to the working space 24 for chip removal.

The cutting fluid pan 92 is arranged at an underfloor bay 142 in FIG. 4. For instance, the cutting fluid pan 92 is arranged below the chip basket 112 when the chip cart 90 is placed in the chip cart bay 72. In the embodiment, the cutting fluid pan 92 is mounted on a chassis 144 and is thus movable out of the underfloor bay 142. This is facilitated by a handle 146. The cutting fluid pan 92 includes a cutting fluid line 148 that can be coupled to the cutting fluid drain line 128 when the cutting fluid pan 92 and the chip cart 90 are positioned in their respective bays 72, 142. The cutting fluid pan includes a cutting fluid container 150 into which the cutting fluid line 148 opens. The cutting fluid container 150 has a flatter but larger footprint compared to the chip cart 112. This means that both the chip basket 112 and the cutting fluid container 150 have storage capacity.

The illustration in FIG. 5 is based on the illustrations according to FIGS. 2-4, although in FIG. 5 the enclosure 64 is not shown. In FIG. 5, the working space 24 of the machine tool 10 and a working space enclosure 156 surrounding it are at least partially shown. The working space 24 includes a chip removal opening 158, which in the embodiment is configured as a chip funnel at a lower end of the working space enclosure 156. The connector piece 94 is coupled to and at least partially surrounds the chip removal opening 158.

The connector piece 94 carries a seal 160 at its end facing the chip cart 90, which in the operating position (compare FIG. 9) rests on the circumferential edge 140 of the chip cart 90. This allows a sufficiently tight connection between the connector piece 94 and the chip cart 90. It is understood that the seal 160 could in principle also be arranged on the chip cart 90.

The cutting fluid pan 92 with the cutting fluid container 150 can be operationally connected via the cutting fluid line 148 to the cutting fluid drain line 128 in the cutting fluid handling section 126 of the chip cart 90. The cutting fluid container 150 is at least sectionally U-shaped (in top view), such that the cutting fluid container 150 surrounds at least one recess 166 into which the chassis 120 of the chip cart 90 can enter (for example, halfway with a track). For example, the chassis 120 of the chip cart 90 is U-shaped in top view, wherein the cutting fluid container 150 is also U-shaped in top view, but with 180° rotated orientation. Accordingly, the two "U-shapes" can move into each other. This reduces the vertical installation space requirement.

In the exemplary embodiment, the cutting fluid pan 92 includes guides 168 for the chassis 120 of the chip cart 90. In other words, in the exemplary embodiment, the cutting fluid container 150 forms at least a portion of the chip cart bay 72. Furthermore, in FIG. 5, 170 indicates a fill level indicator for the cutting fluid container. FIG. 5 also shows lateral guides 174 for the cutting fluid pan 92, which are firmly connected to the frame 62 (not shown in FIG. 5) and form a boundary of the underfloor bay 142 for the cutting fluid pan 92.

Figures 6, 7:
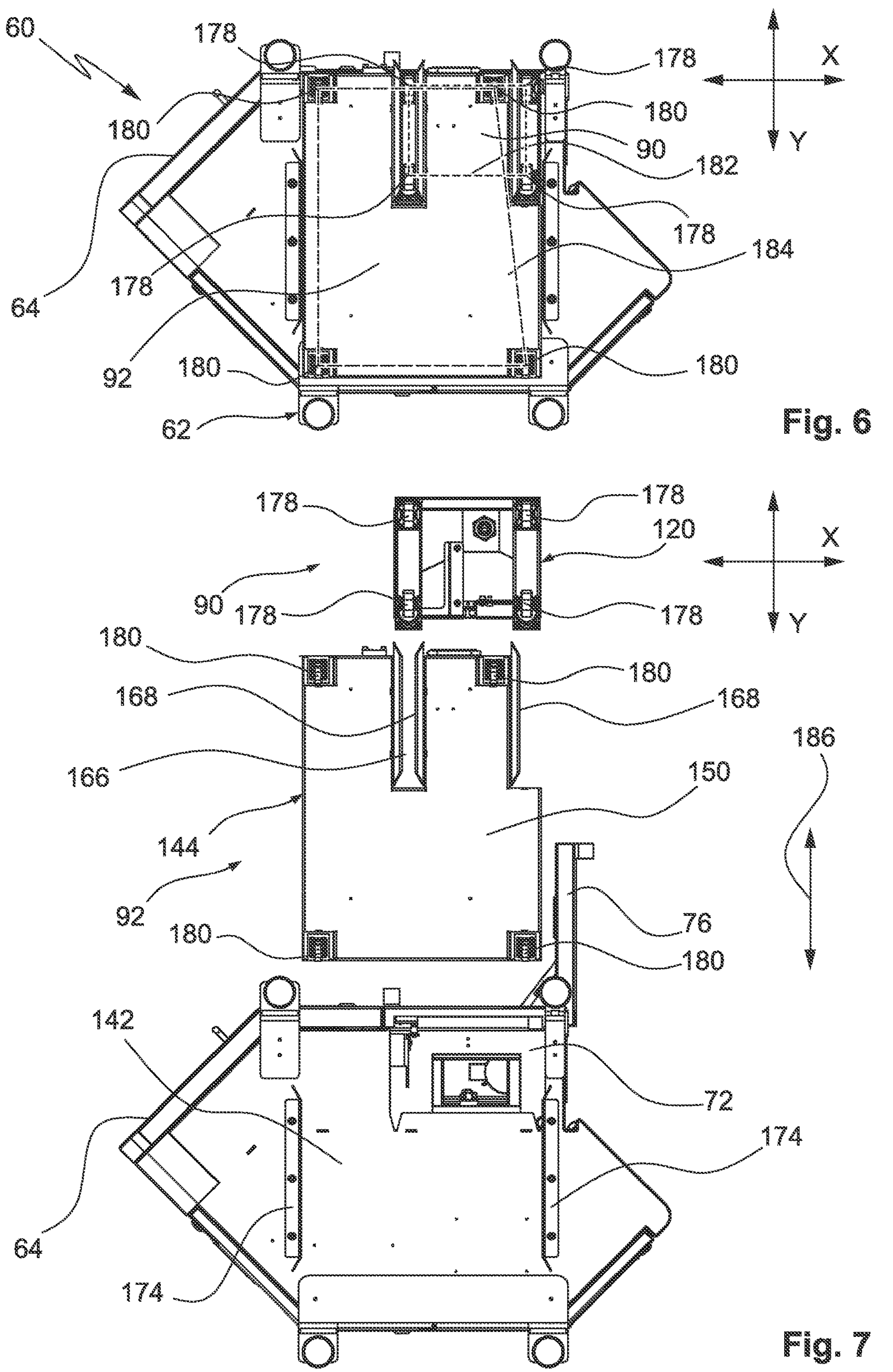
FIG. 6: is a view of the manufacturing system from below, illustrating a nesting between a chip cart and a cutting fluid pan, which are arranged together within an enclosure of the manufacturing system.
FIG. 7: is a view based on FIG. 6, with the chip cart and the cutting fluid pan moved out of the enclosure.

FIGS. 6 and 7 show vertical views (from below) of the manufacturing system 60 with the chip cart 90 and the cutting fluid pan 92. In FIG. 6, the chip cart 90 and the cutting fluid pan 92 are arranged in their respective spaces 72, 142. The chip cart 90 and the cutting fluid pan 92 are integrated into and/or housed (enclosed or covered) by the enclosure 64 that is mounted to the frame 62. In FIG. 7, with the door 76 open, the chip cart 90 and the cutting fluid pan 92 are moved out of their bays 72, 142. This takes place at the front of the manufacturing system 60, compare the arrow 84 in FIG. 2.

In the exemplary embodiment, the chassis 120 of the chip cart 90 has four rollers 178 forming a surface 182, compare FIG. 6. Further, in the embodiment, the chassis 144 of the cutting fluid pan has four rollers 180 forming a surface 184. The surfaces 182, 184 are exemplarily defined by the respective coupling points of the rollers 178, 180 with the chassis 120, 144. The surfaces 182, 184 are oriented horizontally. The surface 182 of the chip cart 90 is at least partially (or, as the case may be, completely) disposed within the surface 184 of the cutting fluid pan 92. This illustrates the interlaced (or overlapping, as the case may be) design under favorable utilization of the given installation space (footprint of the manufacturing system 60).

FIG. 7 illustrates the guides 168 that are provided by the cutting fluid pan for the chassis 120 of the chip cart 90. Further, the recess 166 formed in the cutting fluid container 150 is shown. There, two rollers 178 of the chassis 120 of the chip cart 90 that are arranged in series can enter. Furthermore, FIG. 7 illustrates the guides 174 for the cutting fluid pan, which are coupled to the frame 62. The guides 174 delimit the underfloor bay 142. In FIG. 7, a double arrow indicated by 186 illustrates the respective direction of travel of the chip cart 90 and the cutting fluid pan 92 during moving in and moving out.

Figure 9:
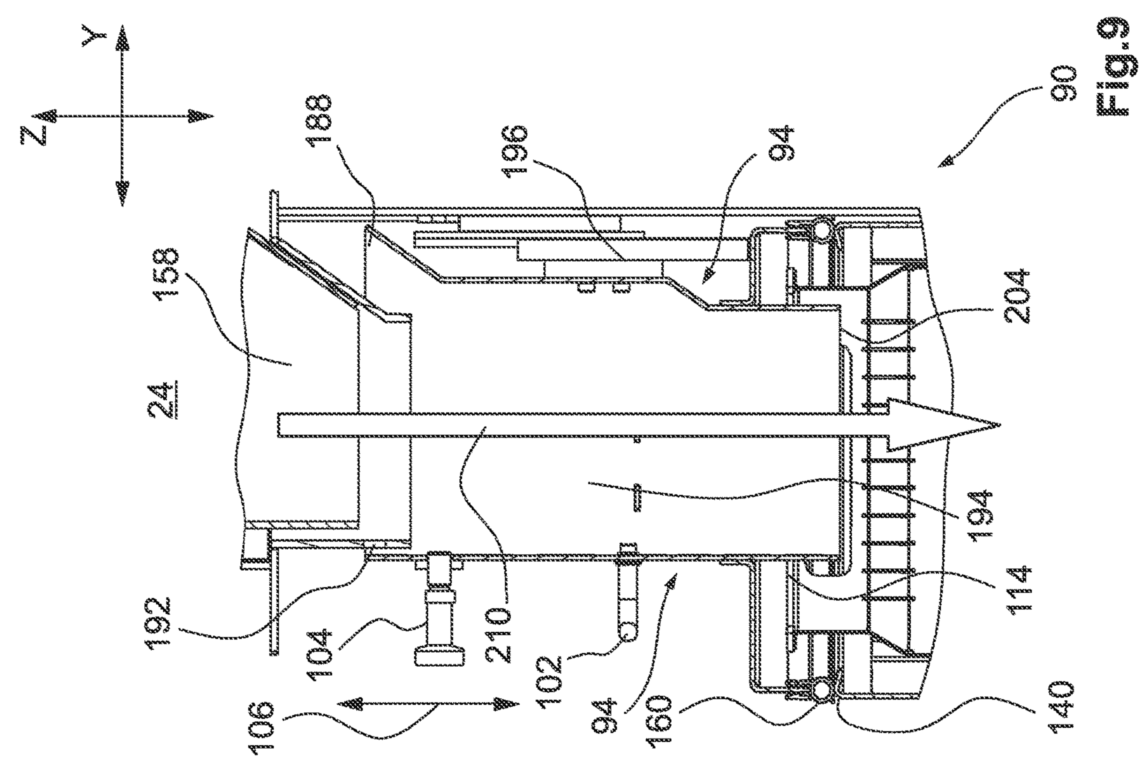
FIG. 9: is an illustration based on FIG. 8, wherein the connector piece in FIG. 9 is in an operating position for operationally coupling the chip cart.
Figure 8:
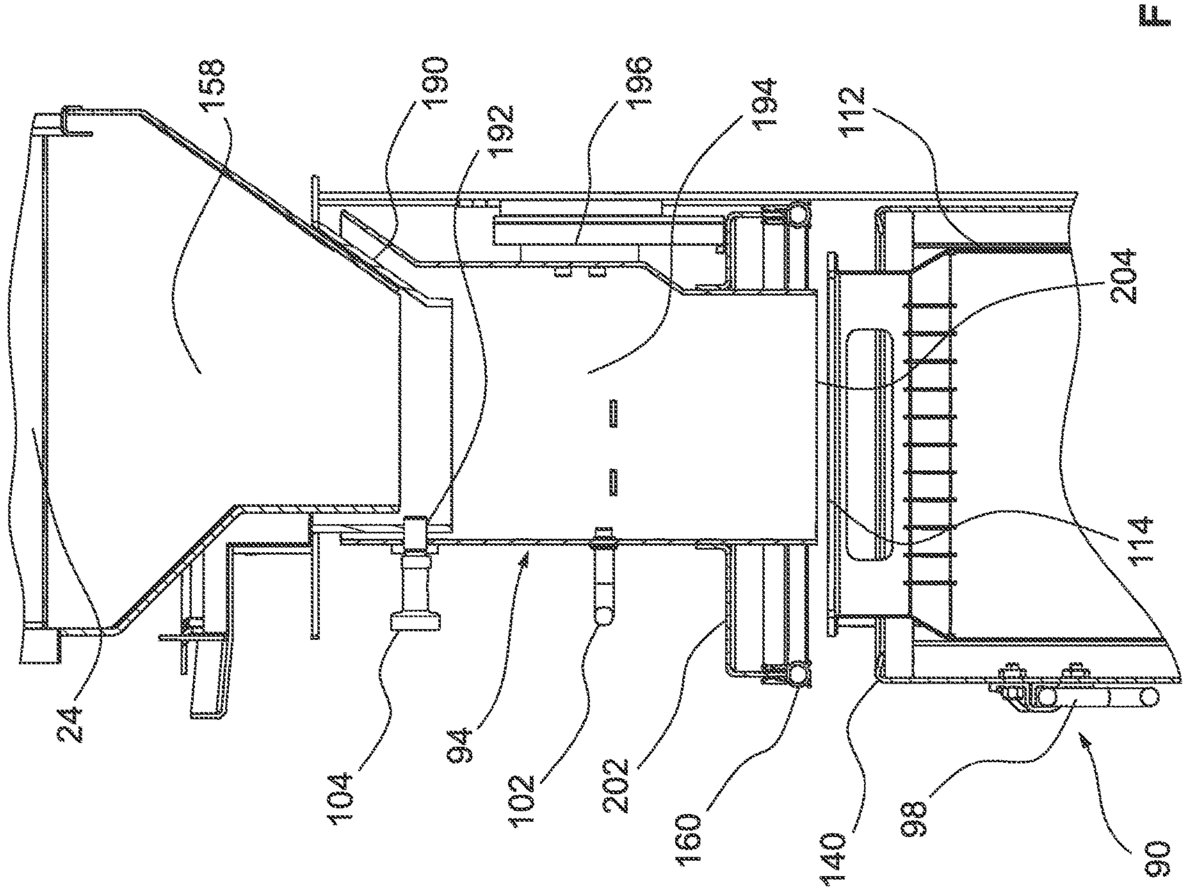
FIG. 8: is a sectional view through a connector piece between a working space of a machine tool and a chip cart of a chip removal device, wherein the connector piece is in a release position.

FIGS. 8 and 9 show by means of cross-sectional views the release position (FIG. 8) and the operating position (FIG. 9) of the connector piece 94. The connector piece 94 is arranged above the chip cart 90 and below the working space 24, compare the vertical Z-axis in FIG. 9. The chip removal opening 158 of the working space opens into the connector piece 94. An edge 188 of the connector piece 94 surrounds and/or overlaps the chip removal opening 158. In the exemplary embodiment, an intermediate piece 190 is also provided, which is part of the chip removal opening 158. Overall, the chip removal opening 158 is approximately funnel-shaped and tapered towards the chip cart 90.

The latching element 104 is mounted at the connector piece 94, which is engaged in a recess 192 of the chip removal opening 158 and/or the intermediate piece 190 in FIG. 8. In this way, the connector piece 94 is secured in the release position shown in FIG. 8. In the operating position shown in FIG. 9, the latching element 104 is disengaged from the recess 192. In this state, the connector piece 94 can be moved vertically (compare the double arrow 106). Due to its own weight, the connector piece 94 can move towards the chip cart 90. The movement can also take place via the handle 102. The connector piece 94 forms a channel 194 for the chip transfer. In the exemplary embodiment according to FIGS. 8 and 9, a lifting guide 196 is provided to simplify the vertical positioning movement, via which the connector piece 94 is vertically movably guided on the frame side.

In the direction towards the chip cart 90, a collar 202 is provided on the connector piece 94, for instance a circumferential collar 202. The collar 202 carries the seal 160. In the operating position according to FIG. 9, the connector piece 94 rests with the seal 160 sufficiently tightly on the circumferential edge 140 of the chip cart 90. Likewise, a (lower) mouth 204 of the connector piece 94 is at least partially moved in the opening 114 of the chip basket 112. This ensures that along a chip removal path 210 between the working space 24 and the chip cart 90, chips are safely directed along the channel 194 through the connector piece 94 into the chip basket 112 of the chip cart 90.

What is claimed is:

1. A chip removal device for a machine tool, comprising:

a movable chip cart having a receptacle for a chip basket, a chip cart bay for the chip cart, and a connector piece between an opening of the chip basket and a chip removal opening of a working space of the machine tool for removing chips from the working space, wherein the chip basket is removable from the chip cart, wherein the chip cart bay is arranged in an enclosure of the machine tool, and wherein the connector piece is displaceable between a release position in which the chip cart is movable out of the chip cart bay and an operating position in which the connector piece and the chip cart are coupled for chip transfer from the working space into the chip cart, wherein the connector piece is vertically movable, and wherein a latching element is provided that is configured to secure the connector piece in the release position.

2. The device of claim 1, wherein the chip cart bay is arranged below the working space of the machine tool.

3. The device of claim 1, wherein the chip cart comprises a columnar body, and wherein the connector piece is disposed above the chip cart and below the working space.

4. The device of claim 1, wherein the chip cart bay is arranged below the chip removal opening of the working space so that a free, gravity-assisted chip transfer towards the chip basket along a chip removal path is enabled.

5. The device of claim 4, wherein the chip transfer between the chip removal opening and the chip basket is performed without drive.

6. The device of claim 4, wherein the chip removal path extends substantially vertically between the working space and the chip basket.

7. The device of claim 1, wherein the chip cart has an edge, wherein the connector piece has a seal, wherein the connector piece rests in the operating position with the seal on the edge of the chip cart, and wherein the connector piece has a mouth towards the chip basket, which in the operating position projects from above into the opening of the chip basket.

8. The device of claim 7, wherein the seal is a circumferential seal, and wherein the edge is a circumferential edge.

9. A chip removal device for a machine tool, comprising:

a movable chip cart having a receptacle for a chip basket, a chip cart bay for the chip cart, and a connector piece between an opening of the chip basket and a chip removal opening of a working space of the machine tool for removing chips from the working space, wherein the chip basket is removable from the chip cart, wherein the chip cart bay is arranged in an enclosure of the machine tool, wherein the connector piece is displaceable between a release position in which the chip cart is movable out of the chip cart bay and an operating position in which the connector piece and the chip cart are coupled for chip transfer from the working space into the chip cart, wherein the chip cart comprises along its vertical extension a chassis, a cutting fluid handling section, and the receptacle for the chip basket, wherein the cutting fluid handling section is disposed between the chassis and the receptacle, wherein the receptacle encloses the chip basket on several sides, and wherein the cutting fluid handling section has an operating opening that is accessible for an operator even with the chip cart being disposed at the chip cart bay.

10. The device of claim 9, wherein a cutting fluid drain line with a quick coupling is arranged in the cutting fluid handling section, which is accessible for the operator and operable through the operating opening.

11. The device of claim 1, further comprising:

a movable cutting fluid pan, wherein the receptacle of the chip cart is arranged above the movable cutting fluid pan, and wherein the cutting fluid pan comprises at least one recess for a chassis of the chip cart.

12. The device of claim 11, further comprising:

an underfloor bay for the movable cutting fluid pan, wherein the cutting fluid pan is movable out of the underfloor bay when the chip cart is moved out of the chip cart bay.

13. The device of claim 11, wherein the cutting fluid pan and the chassis of the chip cart are at least sectionally interlaced with each other.

14. The device of claim 13, wherein the chassis of the chip cart comprises at least three rollers, whose connection points with the chassis span a first surface, wherein the cutting fluid pan has a chassis with at least three rollers, whose connection points with the chassis span a second surface, and wherein the first surface and the second surface at least partially overlap in a top view.

15. The device of claim 11, wherein the cutting fluid pan comprises a cutting fluid container that is at least partially U-shaped in a top view and interrupted by the recess that is accessible for at least a section of the chassis of the chip cart.

16. A manufacturing system for machining workpieces, comprising:

at least one machine tool, which is configured for multi-axis machining and which has a tool holder and a workpiece holder which can be moved relative to one another in at least three axes in a working space of the machine tool, and a chip removal device, comprising:

a movable chip cart having a receptacle for a chip basket, a chip cart bay for the chip cart, and a connector piece between an opening of the chip basket and a chip removal opening of the working space for removing chips from the working space, wherein the chip basket is removable from the chip cart, wherein the chip cart bay is arranged in an enclosure of the machine tool, and wherein the connector piece is displaceable between a release position in which the chip cart is movable out of the chip cart bay and an operating position in which the connector piece and the chip cart are coupled for chip transfer from the working space into the chip cart, wherein the chip removal device is arranged at least substantially below the working space of the machine tool, wherein the chip cart bay is arranged below the chip removal opening of the working space so that a free, gravity-assisted chip transfer towards the chip basket along a chip removal path is enabled, and wherein the chip removal device further comprises:

a movable cutting fluid pan, and an underfloor bay for the movable cutting fluid pan, wherein the receptacle of the chip cart is arranged above the movable cutting fluid pan, and wherein the cutting fluid pan is movable out of the underfloor bay when the chip cart is moved out of the chip cart bay.

17. The manufacturing system of claim 16, further comprising:

a cabinet-like enclosure surrounding an upper part and a lower part, wherein the machine tool is disposed with its working space in the upper part, and wherein the chip cart is disposed in the lower part below the working space of the machine tool.

* * * * *